UNITED STATES PATENT OFFICE.

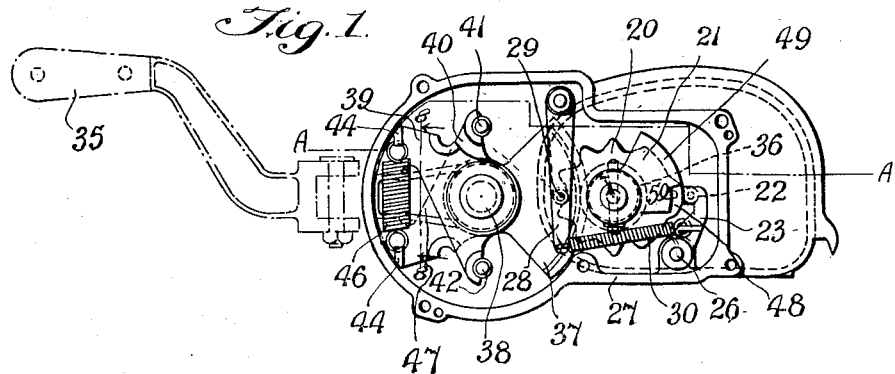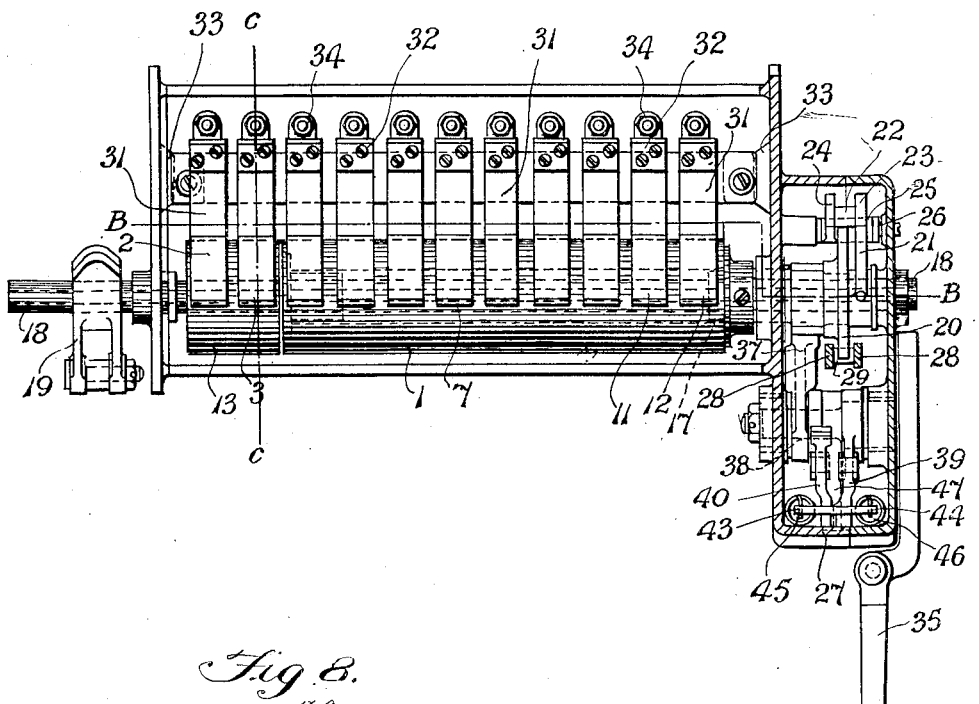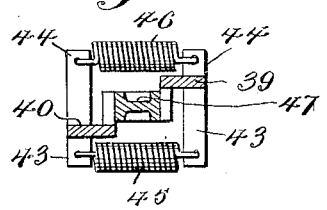

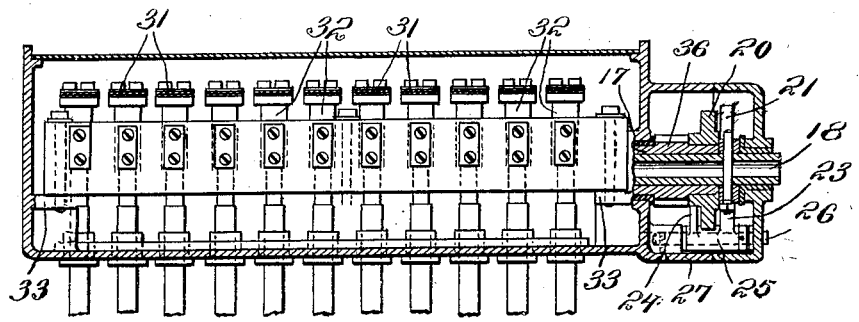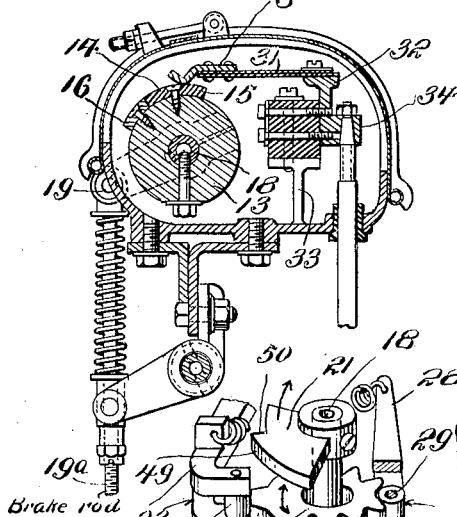

JOHN EDWARD HAMILTON, OF HARROW, ENGLAND.

ELECTRIC CONTROLLER PARTICULARLY FOR USE IN CONNECTION WITH ELECTRICALLY-PROPELLED VEHICLES.

1,322,562.  Specification of Letters Patent.  Patented Nov. 25, 1919.

Application filed December 23, 1916. Serial No. 138,684.

*To all whom it may concern:*

Be it known that I, JOHN EDWARD HAMILTON, a subject of the King of Great Britain, and a resident of Harrow, Middlesex, England, have invented certain new and useful Improvements in Electric Controllers Particularly for Use in Connection with Electrically-Propelled Vehicles, of which the following is a specification.

This invention relates to an improved electric controller particularly for use in connection with electrically propelled vehicles, and has for its object to provide a comparatively simple, easily operated and controlled, self-contained apparatus for the control of the vehicle, and for the protection of the motor or motors and the storage battery from carelessness or negligence on the part of the operator. The invention which—although applicable to other types of vehicle—is especially designed for controlling electric luggage trucks of the type described in the specification of prior application for Letters Patent Serial No. 107696 filed July 5th, 1916, has reference to that general type of apparatus where the braking mechanism is so interlocked with the controller that upon application of the brakes the circuit to the motor is interrupted and cannot be restored until the controller handle is returned to the neutral or "off" position.

The invention consists of a particular construction and arrangement of such apparatus the primary feature of which is that the controller is so interlocked with the braking mechanism of the vehicle that application of the braking mechanism results not only in the breaking of the motor circuit and preventing its reëstablishment until the controller handle is restored to neutral or off position but also insures the locking of the braking mechanism in its operative or "on" position until the controller handle is at the neutral position. In practice the handle may be biased to this position and my invention involves a special means for effecting this. Further features of the invention consist of the particular means employed for locking the circuit controlling portion of the drum when the brakes are applied with the speed regulating portion of the drum in any but neutral position, the special construction of the controller drum in two independently rotatable portions and the particular construction of the contact fingers which coöperate with contact segments on the drums.

In order that the invention may be more readily understood and carried into practice, reference is hereby made to the accompanying drawings wherein I have illustrated an embodiment of my invention. In these drawings:

Figure 1 is an end elevational view of a controller.

Fig. 2 is a plan of Fig. 1 taken on the line A—A, wherein the segments are removed from the controller and cut out barrels.

Fig. 3 is a section on the line B—B of Fig. 2.

Fig. 4 is a section on the line C—C of Fig. 2.

Fig. 5 is a detail horizontal sectional view of my improved controller.

Fig. 6 is a detail perspective view, partly in section, of the means for locking the controller.

Fig. 7 is a detail perspective view of the centering arm.

Fig. 8 is a detail transverse sectional view of the same and of the extension arm, and shows the spring which connects the centering arm in elevation.

Referring to these drawings it may be seen that a drum type controller, having contacts on a movable drum or barrel and corresponding contact fingers, has been depicted. Both the drum and the fingers have special features, and are designed with regard to adjustment and strength, and with regard to the bridging of the contacts. Referring more specifically to the drawings the numeral 1 indicates the movable drum and the numerals 2, 3, 4, 5, 6, 7, 8, 9, 10, 11 and 12 indicate the eleven contact fingers shown in Fig. 2. At one end of the contact barrel 1 is placed an extension drum or barrel 13 carrying contacts which coöperate with the fingers 2 and 3 to act as the main switch in the motor circuit. One of the contact segments indicated by the numeral 14 is shown in Fig. 4, and comprises a contact strip proper 15 and an insulating portion 16. It will be appreciated that the controller may be, and preferably is, designed for use with a truck adapted to run in either direction in which case the contact segments would be suitably disposed to permit of the same functioning of the controller for either direction of rotation of the drum. The barrel 1 is rigidly secured to a sleeve 17 loosely mounted on a hollow shaft 18, to which is secured the drum 13. The shaft 18 is connected by suitable linkage, indicated at 19, to the rod 19ª which operates the brake mechanism of the vehicle, and the arrangement is such that when the brakes are applied the shaft 18 is rotated to bring the contact fingers 2 and 3 upon the insulating portions of their respective contact segments to break the motor circuit; and means are provided for locking the controller in that position. To this end a notching wheel 20 is secured to the sleeve 17, and a cam segment 21 is secured to the shaft 18, and coöperating with them is a pawl comprising a roller 22 carried between two arms 23 and 24; said arms 23 and 24 being mounted upon a sleeve 25 carried by a spindle 26 journaled in the casing 27. A pair of arms pivotally mounted on the main casing carry a roller 29 which also coacts with the notching wheel 20, and a spring 30 connects the pawl arm 23 with one of the arms 28 to maintain the pawl and the roller 29 in contact with the respective coöperating parts. This mechanism functions as will hereafter be described to lock the controller in position should the brake be put on and the shaft 18 rotated to break the motor circuit, and to maintain the controller in such a position until the operating handle is returned to neutral position.

The contact fingers 2 to 12 each comprise a laminated spring 31 at the end of which the contact piece is riveted or otherwise rigidly secured; while the other end of the spring 31 is attached to a suitable supporting pillar or bracket 32, which is rigidly secured to an insulating block on the support 33. Each of the brackets 32 carries a binding post 34, by means of which the desired electrical connection may be made to its respective finger.

In order that the controller may be manipulated by means of the handle 35, the sleeve 17 is provided with a toothed wheel 36 which gears with a toothed sector 37 keyed or otherwise secured to rotate with the shaft 38 which the handle 35 is adapted to rotate. The controller is biased to neutral position, so that should the operator remove the pressure from it, either by accident or design, it will immediately return to that position which corresponds to the position of the controller wherein the circuit is broken and the entire resistance is included in the motor circuit. In order to insure the return of the handle 35 to neutral position a special arrangement of centering arms is provided, which comprises two arms 39 and 40 loosely mounted on the shaft 38. Upon reference to Fig. 1 it will be seen that the centering arms 39 and 40 are somewhat triangular in shape and provided with recesses adapted to coöperate with stops 41 and 42. Each centering arm is provided with projecting portions 43 and 44 as shown in Figs. 1 and 2 whereby the two arms may be connected by means of the two stout springs 45 and 46.

Rigidly secured to rotate with the shaft 38 is an extension arm 47 which in normal position lies in contact with both the centering arms 39 and 40 as may be seen in Fig. 1 whereby movement of the handle 35 to rotate the shaft 38 and with it the arm 47 will cause the said arm 47 to carry one or other of the arms 39 or 40 with it against the action of the springs 45 and 46, which upon release of the handle immediately operate to return the shaft, and consequently the controller handle and drum, to neutral position. The stops 41 and 42 are suitably placed to limit the rotation of the shaft and so prevent overrunning of the controller barrel. The relative positions of the members 20 and 21 for that position of the barrel 1 which corresponds to all resistance in the motor circuit, and that position of the shaft 18 which corresponds to the brake on and the motor circuit open is shown in Fig. 1; and it will be seen that the roller 22 is in contact with the high cam portion 48 of the wheel 20. To close the motor circuit the shaft 18 is rotated and carries with it the cam segment 21 so that the pawl 23 rides over the curved surface 49, thus holding the roller 22 out of contact with the wheel 20 when the latter is partly rotated. To cut resistance out of the motor circuit the sleeve 17 is rotated and carries with it the wheel 20 so that the high portion 48 is removed from the line of action of the roller 22. Should the brake be put on before the removal of the resistance from the motor circuit, the cam segment 21 keyed to the shaft 18 will be returned to neutral position, and the wheel 20 attached to the controller barrel will remain as it was. As a result of this the pawl arm 23 will be enabled to fall into the notch 50 of the segment 21, so locking the shaft 18 in that position which breaks the motor circuit, until such time as the wheel 20 is returned to neutral position to enable its cam 48 to raise the pawl 23 from the notch 50.

What I claim and desire to secure by Letters Patent is:—

1. A controller for the motors of electrically propelled vehicles having friction brakes, and comprising a controller drum having two independently rotatable drum portions, one portion carrying means for controlling the continuity of the motor circuit and being mechanically connected both to the controller handle and to the brake mechanism to be operated thereby, and the other portion carrying speed regulating means, and means for locking the circuit controlling portion of the drum and preventing effective operation of the controller if the brakes are applied and the controller portion of the drum is in any but neutral position, said means comprising a pawl, a cam segment rotatable with the circuit controlling portion of the drum, and a notching wheel rotatable with the controller portion of the drum.

2. A controller for the motors of electrically propelled vehicles having friction brakes, and comprising a controller drum having two independently rotatable drum portions, one portion carrying means for controlling the continuity of the motor circuit and being mechanically connected both to the controller handle and to the brake mechanism to be operated thereby, and the other portion carrying speed regulating means, means operating automatically to lock the brake mechanism in effective position and the circuit completing members of the controller against reclosure until the controller handle has been restored to neutral position, and means to normally maintain the controller handle in neutral position, said means comprising two spring pressed segments loosely mounted on the handle shaft, and an extension arm rigidly secured to said shaft and arranged to operate said segment against spring tension.

3. A controller for the motors of electrically propelled vehicles, comprising independently operable circuit closing and progressive speed regulating means, common means for operating said circuit closing and speed regulating means, means to normally maintain said common operating means in neutral position, a brake operating means, and connections between said brake operating means, said circuit closing means and said common operating means to cause the circuit closing means to open the circuit when the brake operating means is in applied position, to also lock the brake operating means in such position, and to render the reclosure of the circuit and the release of the brake both dependent upon the return of the common operating means to neutral position.

4. A controller for the motors of electrically propelled vehicles having friction brakes comprising, a contact drum and stationary contacts coöperating to complete the motor circuit, a second contact drum and a second series of stationary contacts coöperating to effect progressive speed regulation, a single handle operable to rotate both drums, a connection between the operating rod of the vehicle brakes and the circuit completing contact drum whereby application of the vehicle brakes insures rotation of the circuit completing drum to circuit breaking position, and means operating to both lock the brake in operative position and prevent reclosure of the motor circuit until the return of the operating handle to neutral position, substantially as specified.

5. A controller for the motors of electrically propelled vehicles having friction brakes, comprising a controller drum having two independently rotatable drum portions, one portion carrying means for controlling the continuity of the motor circuit and being mechanically connected both to the controller handle and to the brake mechanism to be operated thereby, and the other portion carrying speed regulating means, and means for locking the circuit controlling portion of the drum and preventing effective operation of the controller if the brakes are applied when the controller portion of the drum is in any but neutral position.

6. A controller for the motors of electrically propelled vehicles having friction brakes comprising a circuit making and breaking drum, a speed regulating drum, common operating means operable by hand for effecting movement of both said drums, mechanical means connecting both said drums to said operating means, a mechanical connection between the circuit making and breaking drum and the operating rod of the vehicle brakes for effecting movement of the circuit making and breaking drum independently of the speed regulating drum, and means operating to both lock the brake in operative position and prevent movement of the circuit controlling drum from circuit breaking position until the return of the operating means to neutral position, substantially as specified.

7. A controller for the motors of electrically propelled vehicles having friction brakes comprising, a contact drum and stationary contacts coöperating to complete the motor circuit, a second contact drum and a second series of stationary contacts coöperating to effect progressive speed regulation, a single handle operable to rotate both said drums, a connection between the operating rod of the vehicle brakes and the circuit completing contact drum whereby application of the vehicle brakes insures rotation of the circuit completing drum to circuit breaking position, a pawl, a cam segment rotatable with the circuit controlling drum with which said pawl coöperates, and a notching wheel rotatable with the speed regulating drum whereby release of the vehicle brakes and reëstablishment of the motor circuit are dependent upon the return of the controller handle and speed regulating drum to neutral position, substantially as specified.

8. A controller for the motors of electrically propelled vehicles having friction brakes comprising a circuit making and breaking drum, a speed regulating drum, common operating means operable by hand for effecting movement of both said drums, mechanical means connecting both said drums to said operating means, a mechanical connection between the circuit making and breaking drum and the operating rod of the vehicle brakes for effecting movement of the circuit making and breaking drum independently of the speed regulating drum, a pawl, a cam segment rotatable with the circuit controlling drum with which said pawl coöperates, and a notching wheel rotatable with the speed regulating drum whereby release of the vehicle brakes and reëstablishment of the motor circuit are dependent upon the return of the speed regulating drum to neutral position, substantially as specified.

9. A controller for the motors of electrically propelled vehicles having friction brakes comprising, a contact drum and stationary contacts coöperating to complete the motor circuit, a second contact drum and a second series of stationary contacts coöperating to effect progressive speed regulation, a single handle operable to rotate both said drums, two segments loosely mounted on the shaft of said operating handle, springs against which said segments are adapted to be operated, an extension arm secured to said shaft through which said segments are operated whereby said operating handle is biased to neutral position, and a connection between the operating rod of the vehicle brakes and the circuit completing contact drum whereby application of the vehicle brakes insures rotation of the circuit completing drum to circuit breaking position, substantially as specified.

10. A controller for the motors of electrically propelled vehicles having friction brakes comprising, a circuit making and breaking drum, a speed regulating drum, common operating means operable by hand for effecting movement of both said drums, two segments loosely mounted on the shaft of said operating means, springs against which said segments are adapted to be operated, an extension arm secured to said shaft through which said segments are operated whereby said operating means are biased to neutral position, mechanical means connecting both said drums to said operating means, and a mechanical connection between the circuit making and breaking drum and the operating rod of the vehicle brakes for effecting movement of the circuit making and breaking drum independently of the speed regulating drum, substantially as specified.

In testimony whereof I affix my signature.

JOHN EDWARD HAMILTON.